US009753552B1

(12) United States Patent
White et al.

(10) Patent No.: US 9,753,552 B1
(45) Date of Patent: Sep. 5, 2017

(54) ORIENTATION LOCK

(71) Applicant: Amazon Technologies, Inc., Reno, NV (US)

(72) Inventors: Jeffrey A. White, Seattle, WA (US); Cody B. Meyer, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 25 days.

(21) Appl. No.: 14/220,652

(22) Filed: Mar. 20, 2014

Related U.S. Application Data

(63) Continuation of application No. 12/607,400, filed on Oct. 28, 2009, now Pat. No. 8,717,285.

(51) Int. Cl.
*G06F 3/0346* (2013.01)

(52) U.S. Cl.
CPC .................................. *G06F 3/0346* (2013.01)

(58) Field of Classification Search
CPC .................................. G09G 5/00; G06F 3/041
See application file for complete search history.

(56) References Cited

U.S. PATENT DOCUMENTS

| 2008/0163119 | A1* | 7/2008 | Kim | G06F 3/04886 |
| | | | | 715/840 |
| 2008/0165144 | A1* | 7/2008 | Forstall | G06F 1/1626 |
| | | | | 345/173 |
| 2008/0259025 | A1* | 10/2008 | Eom | G06F 3/03549 |
| | | | | 345/156 |
| 2009/0150828 | A1 | 6/2009 | Baker et al. | |
| 2009/0256861 | A1* | 10/2009 | Sacher | G06F 1/1624 |
| | | | | 345/650 |
| 2010/0020035 | A1* | 1/2010 | Ryu | G06F 3/04883 |
| | | | | 345/173 |
| 2011/0012926 | A1* | 1/2011 | Kerr et al. | 345/649 |

OTHER PUBLICATIONS

Office action for U.S. Appl. No. 12/607,400, mailed on Feb. 14, 2013, White et al., "Orientation Lock", 46 pages.
Office action for U.S. Appl. No. 12/607,400, mailed on Jul. 15, 2013, White et al., "Orientation Lock", 46 pages.
Non-Final Office Action for U.S. Appl. No. 12/607,400, mailed on Aug. 20, 2012, Jeffrey A. White et al., "Orientation Lock", 39 pages.

* cited by examiner

*Primary Examiner* — Tony N Ngo
(74) *Attorney, Agent, or Firm* — Lee & Hayes, PLLC

(57) ABSTRACT

Disclosed are methods, computer-readable media and systems for locking an orientation of content on a display to prevent automatic and inadvertent orientation changes. An orientation lock module receives input from a user and presents a lock control for a pre-determined time. When locked, orientation of content on the display remains unchanged regardless of motion. When unlocked, orientation of content on the display may automatically change in response to detecting a motion.

20 Claims, 8 Drawing Sheets

ORIENTATION LOCK

RELATED APPLICATIONS

This application claims priority to and is a continuation of U.S. patent application Ser. No. 12/607,400, filed on Oct. 28, 2009, the entire contents of which are incorporated herein by reference.

BACKGROUND

A variety of portable devices such as electronic book readers ("e-book readers"), cellular telephones, personal digital assistants ("PDAs"), portable media players, tablet computers, netbooks, and the like, may orient display of content in relation to motion of the device. For example, a cellular phone may automatically reorient text on a screen from a "portrait" orientation to a "landscape" orientation or vice versa upon rotation of the device.

However, the very portability of these devices may make this automatic reorientation distracting or undesirable to a user. For example, a user holding the portable device while laying down may roll from one side to another, with such motion triggering an undesired and inadvertent orientation change. In another example, a user in an airplane experiencing turbulence may also suffer undesirable orientation changes.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes a method and system for unobtrusively locking an orientation of content on a display to prevent automatic and inadvertent orientation changes. An orientation lock module receives input from a user and, in response, presents a lock control for a pre-determined time. When locked, orientation of content on the display remains unchanged regardless of motion. When unlocked, orientation of content on the display may change in response to orientation changes experienced by the device. By providing an ability to conveniently present lock and unlock controls, users may reduce inadvertent orientation changes on a display. This results in a more pleasant experience and improved ergonomics.

The discussion begins with a section entitled "Illustrative Architecture," which describes a non-limiting architecture in which the claimed techniques may be implemented. A section entitled "Illustrative Processes and Displays" follows. This section depicts and describes illustrative examples of the orientation lock. This section also illustrates and describes flow diagrams for two implementations. Finally, a brief conclusion ends the discussion.

This brief introduction, including section titles and corresponding summaries, is provided for the reader's convenience and is not intended to limit the scope of the claims, nor the proceeding sections. Furthermore, the techniques described in detail below may be implemented in a number of ways and in a number of contexts. Several example implementations and their context are provided with reference to the following figures, as described below in more detail. However, it is to be appreciated that the following implementations and contexts are but one of many.

Illustrative Architecture

Figure 1:
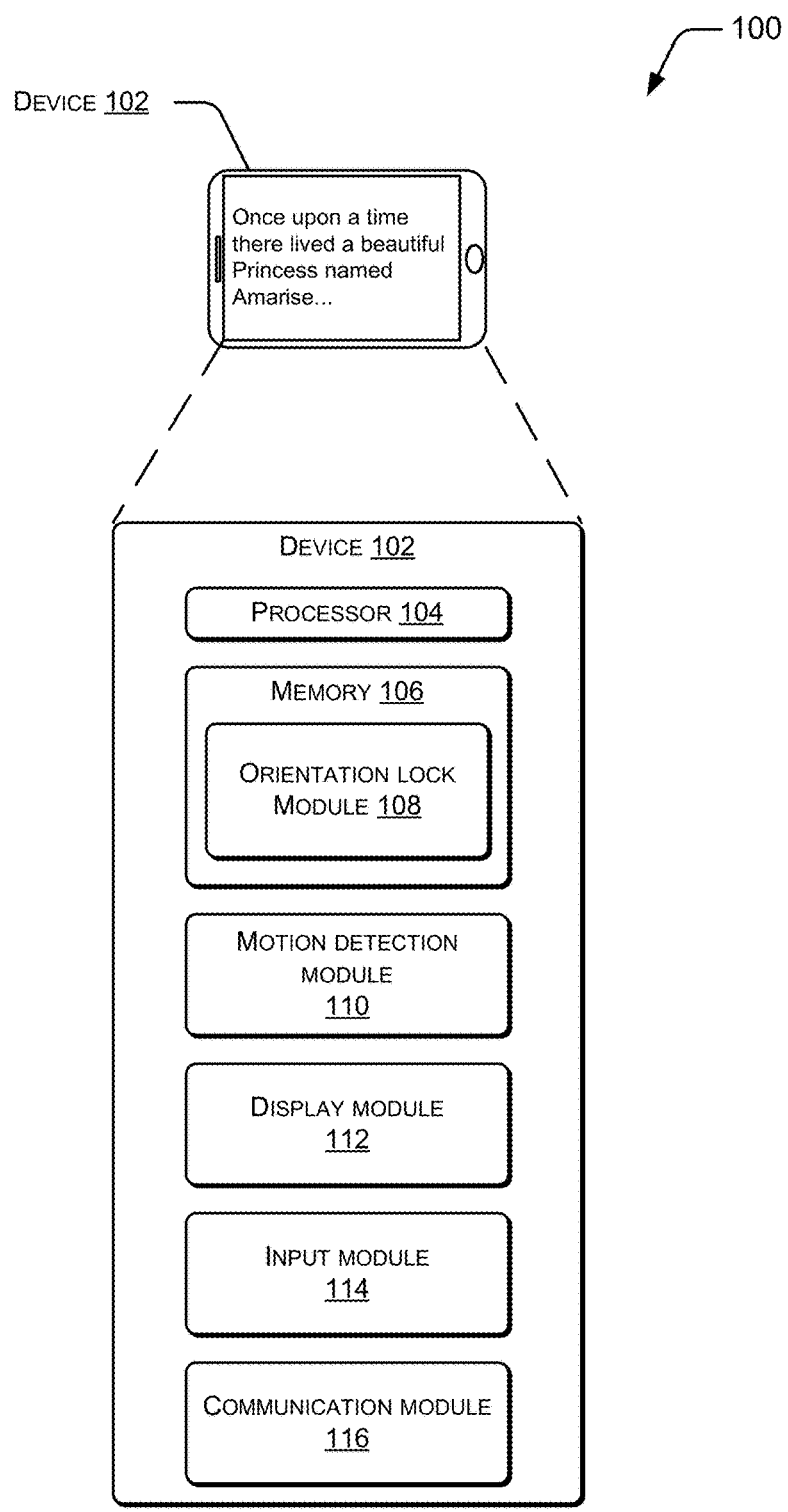
FIG. 1 illustrates an example portable electronic device which may implement an orientation lock.

FIG. 1 illustrates an example architecture 100 that includes a portable electronic device 102 that may implement an orientation lock. Device 102 may comprise a processor 104 configured to executed instructions stored in a memory 106. Memory 106 may store an orientation lock module 108 comprising instructions which, when executed on the processor, display an orientation lock status icon, process user input, and adjust the orientation of content on a display, as described in more detail below.

Device 102 may also incorporate a motion detection module 110. Motion detection module may comprise an accelerometer, a gyroscope, a strain gauge, or other sensor to determine translations, rotations, distortions (i.e., flexing or bending), or other physical motions of the device 102. As described in this application, modules and engines may be implemented using software, hardware, firmware, or a combination of these.

Display module 112 may, but need not, be present within device 102. Display module 112 may comprise a display device such as a liquid crystal display, organic light emitting diode, or other device configured to render an image.

Device 102 may accept input from a user via an input module 114. Input module 114 may be configured to receive user input from a button, voice command, a switch, a touch screen, a touchpad, a mouse, a strain gauge, and so forth.

A communication module 116 within device 102 may be configured to allow communication of data between device 102 and another device or server. Communication module 116 may provide wired or wireless communications to public networks such as a telephone network, internet, and so forth, or private networks such as a corporate intranet and so forth. For example, device 102 may acquire content for display on the display module using communication module 116.

Illustrative Processes and Displays

Figure 2:
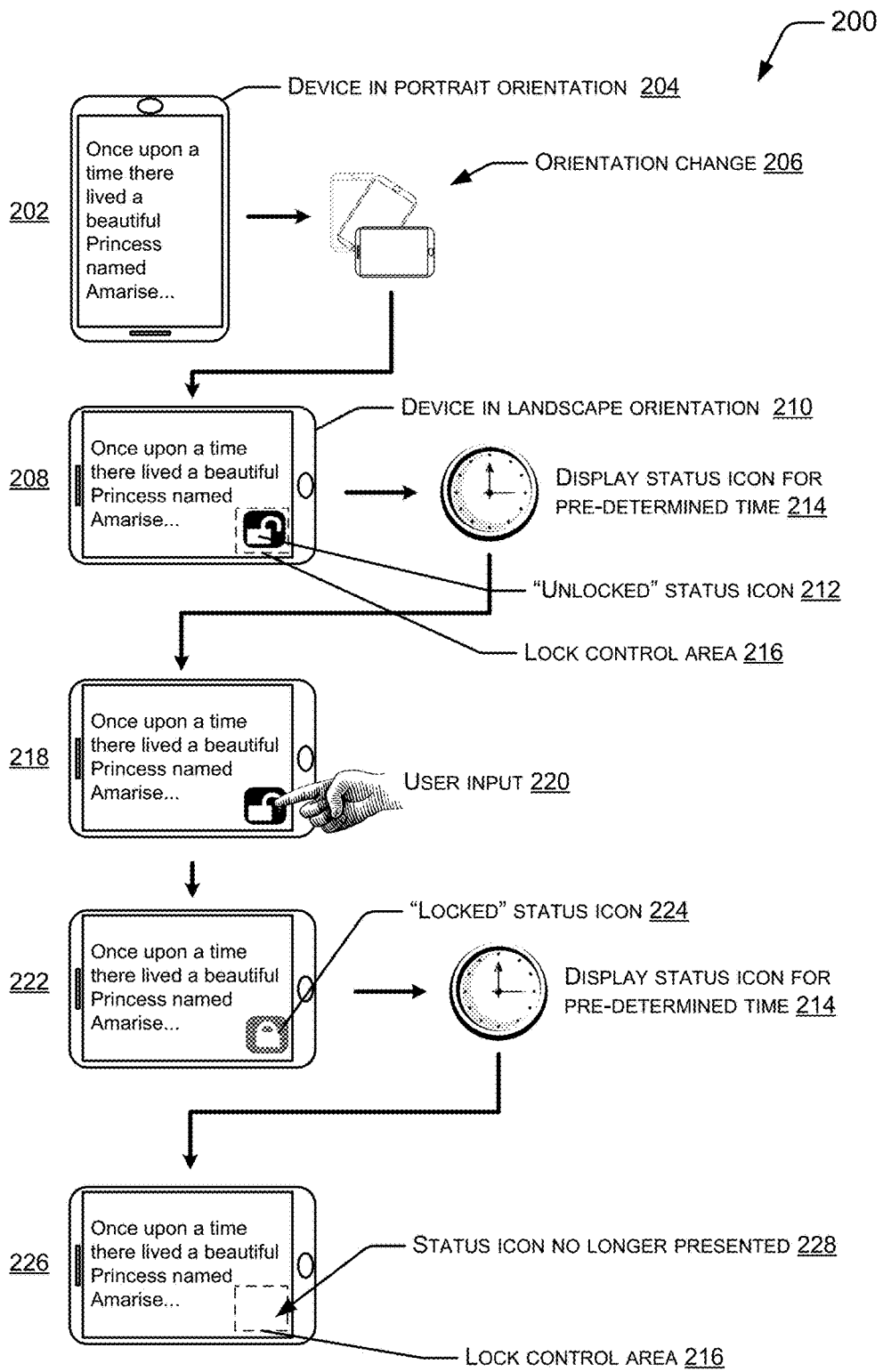
FIG. 2 illustrates an example process and display of an orientation lock status icon after motion and activation of an orientation lock by a user on the device of FIG. 1.

FIG. 2 illustrates a process 200 and display of an orientation lock status icon after activation of an orientation lock in response to a user moving the device 102. At 202, the device 102 is depicted showing content on the display module 114 in a portrait orientation 204. Following an orientation change 206 where the user rotates the device 90 degrees clockwise, at 208 the device now appears in a landscape orientation 210. As a result of the motion input from the orientation change 206, the device 102 has rotated the content on the display module 114 by 90 degrees counterclockwise. Furthermore, as a result of the motion input the orientation lock module 108 displays an "unlocked" status icon 212 for display on display module 114. In this example, the "unlocked" status icon 212 is depicted as a stylized open padlock. However other representations either graphical, textual, and so forth may be used. The orientation lock module 108 continues to display the status icon for a pre-determined time interval 214. This pre-determined time interval may be pre-configured, user-defined, or dynamically adjusted by the orientation lock module 108 according to parameters such as an average time to select the orientation lock, a type of content displayed, an orientation of content on the display, and so forth. In some implementations, the pre-determined time interval may be at least about 1 second and at most about 3 seconds.

Upon expiration of the pre-determined time interval 214, the status icon is removed from the display module 114 assuming that no further user input has been received. In some implementations, this "unlocked" status icon 212 may be opaque, that is, objects displayed in the background and "behind" the icon in a deeper "Z" layer are not visible. In other implementations, the "unlocked" status icon 212 may be partially opaque, that is, items "behind" the icon are less visible than if the icon is not displayed When device 102 comprises a touch-sensitive display, orientation lock module 108 may designate a lock control area 216 on the display module 114. This lock control area 216 may be configured to accept input from the user and receive selections such as activating/deactivating the orientation lock. In one implementation, lock control area 216 may be coincident with the status icon. However, in another implementation the lock control area 216 may be in a different location than the status icon.

In another implementation, device 102 may accept input from a button, keyboard, speech recognition, or other input device to activate/deactivate the orientation lock. While the implementations shown in this application place the status icon and the lock control area 216 in the lower right corner of the display as oriented to the user and relative to the displayed content, in other implementations the status icon, or lock control area 216, or both may be positioned elsewhere.

At 218, a user input 220 is processed by the orientation lock module 108. In this illustration, the user input 220 comprises a user touching the lock control area 216 on a touch-sensitive display module 114 which is coincident with the "unlocked" status icon 212. Again, the user could similarly provide this input in any other suitable manner, such as by a mouse, a keyboard or the like.

At 222, the orientation lock module 108 has locked the orientation of content presented on the display, and displays a "locked" status icon 224 for display on display module 114 in place of the "unlocked" status icon 212. In this example, the "locked" status icon 224 is depicted as a stylized closed padlock, although other icons may be used. In some implementations, the "locked" status icon 224 may be semi-transparent, that is, objects displayed in the background are visible or partially visible. As above, the orientation lock module 108 continues to display the status icon for a pre-determined time interval 214. The pre-determined time intervals 214 for displaying the "unlocked" status icon 212 and "locked" status icon 224 may be substantially the same, or may differ from one another. For example, the "unlocked" status icon 212 may remain displayed for about 10 seconds while the "locked" status icon 224 may be displayed for about 3 seconds.

Upon expiration of the pre-determined time interval, at 226 the status icon is removed from the display and the status icon is no longer presented 228. However, the lock control area 216 remains active and, thus, a user input 220 would invoke the orientation lock module 108.

Figure 3:
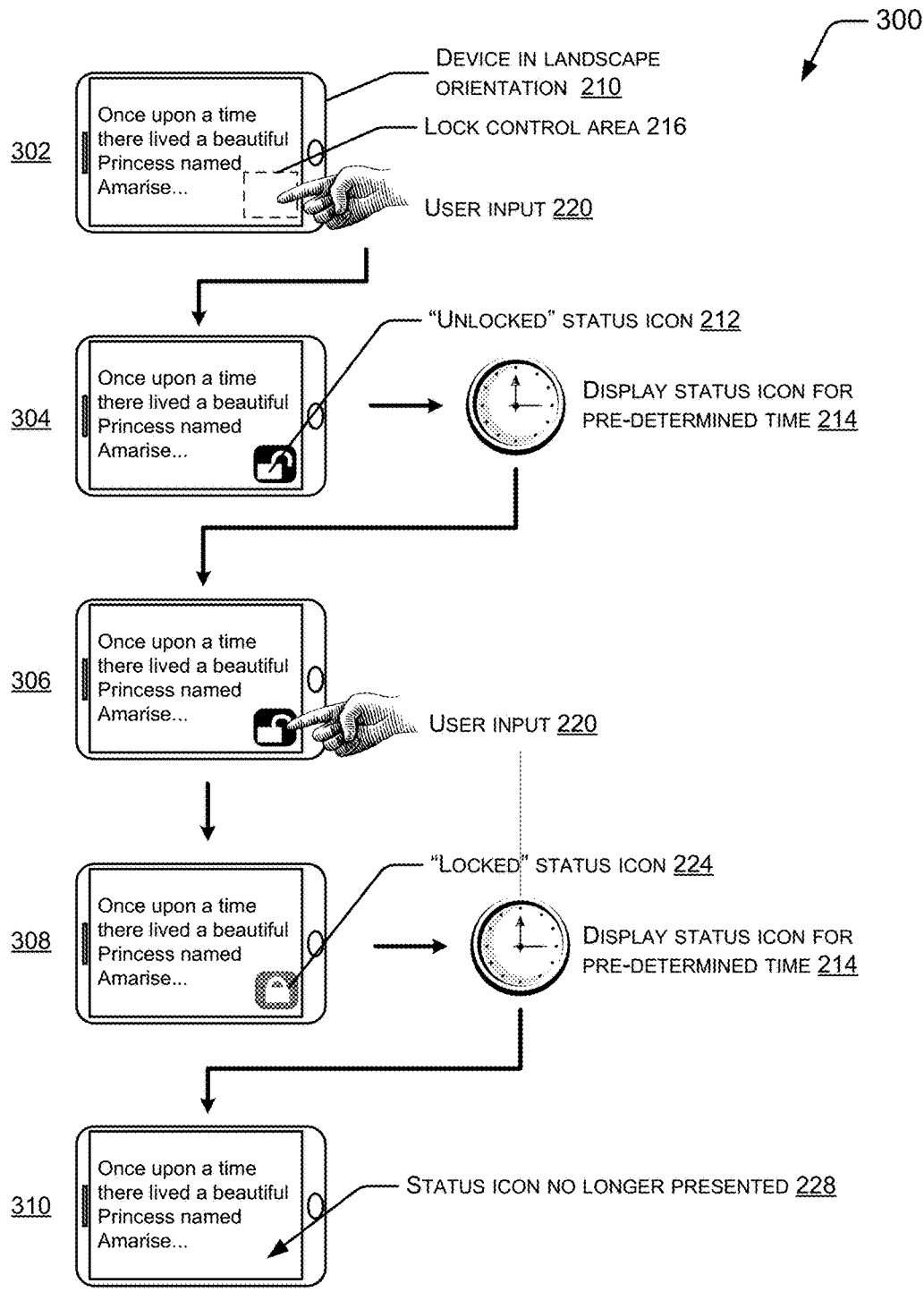
FIG. 3 illustrates an example process and display of an orientation lock status icon after user input and activation of an orientation lock on the device of FIG. 1.

The orientation lock may also be accessed without a motion input. FIG. 3 illustrates an example process 300 and display of an orientation lock status icon after user input and activation of an orientation lock. At 302, device 102 is displaying content in a landscape mode 210, and no status icon is displayed. The orientation lock module 108 processes a user input 220 resulting from the user selecting the lock control area 216.

At 304, the "unlocked" status icon 212 is displayed for a pre-determined amount of time 214. At 306, the user selects by way of user input 220 the lock control area 216 which is coincident with the "unlocked" status icon 212, and activates the orientation lock. At 308, the orientation lock module 108 displays the "locked" status icon 224 on display module 114 and engages the orientation lock, preventing the orientation of content on the display from changing. As above, the orientation lock module 108 displays the "locked" status icon 224 for a pre-determined time 214.

Upon expiration of the pre-determined time interval 214, at 310 the status icon is no longer presented 228. However, the lock control area 216 remains active, thus a user input 220 would again invoke the orientation lock module 108.

Figure 4:
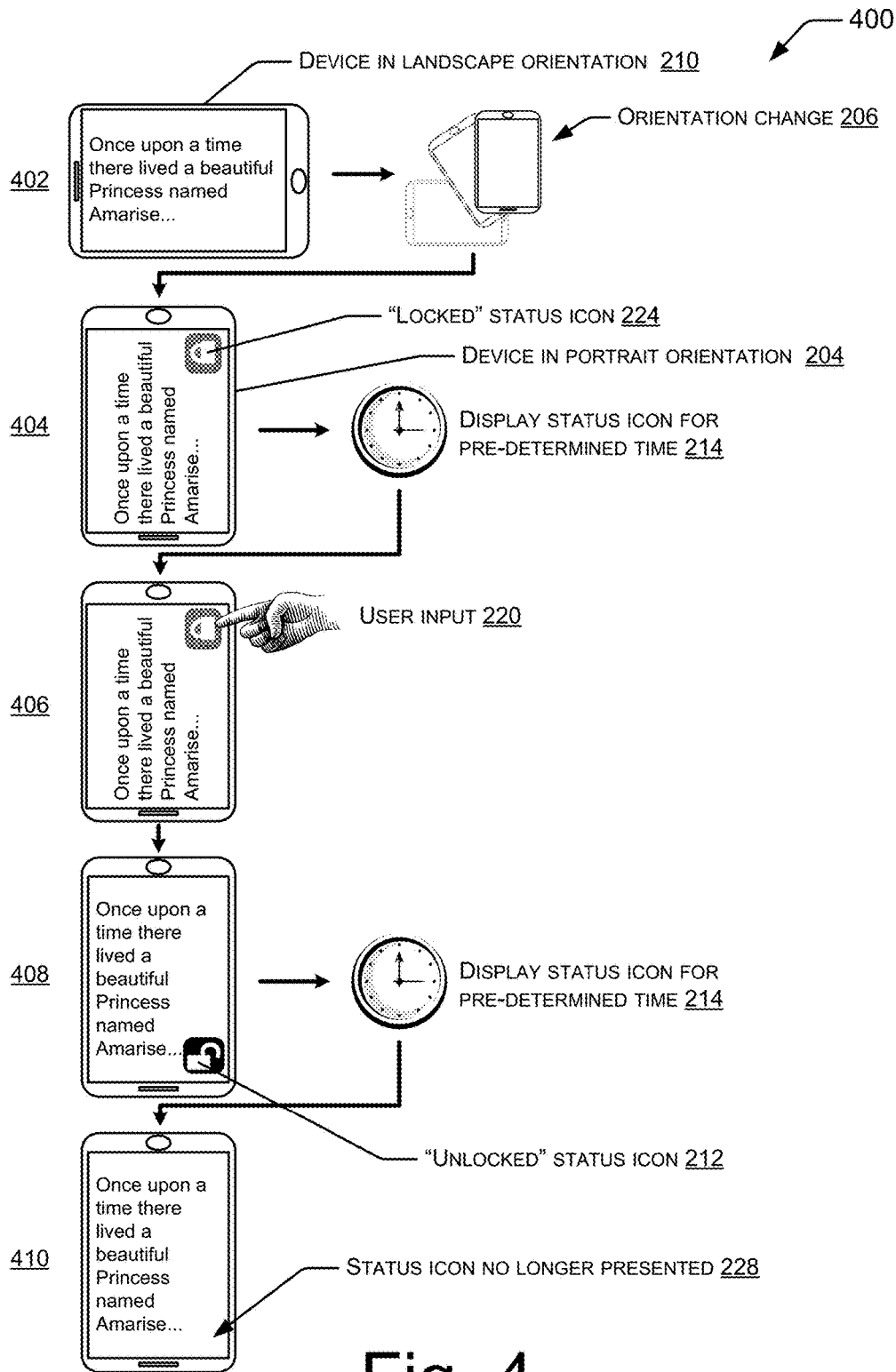
FIG. 4 illustrates an example process and display of an orientation lock status icon after motion and deactivation of an orientation lock on the device of FIG. 1.

Motion input may engage the orientation lock module 108 to display the status icon. FIG. 4 illustrates this process and display 400. At 402 the device 102 is in a landscape orientation 210, and undergoes an orientation change 206 to portrait orientation 204. At 404, the device 102 is in portrait orientation 204 and the orientation lock module 108 has displayed the "locked" status icon 224, which will be displayed for a pre-determined time 214.

At 406, the user input 220 is received by the orientation lock module 108 and the orientation lock is toggled from the "locked" state to the "unlocked" state. Following the unlock, at 408 the orientation lock module 108 changes the orientation of the content on the display to correspond to the orientation change 206, and displays the "unlocked" status icon 212 for a pre-determined time 214. As above, upon expiration of the pre-determined time interval 214, the status icon is no longer presented 228 at 410. However, the lock control area 216 remains active and, thus, a user input 220 would invoke the orientation lock module 108.

Figure 5:
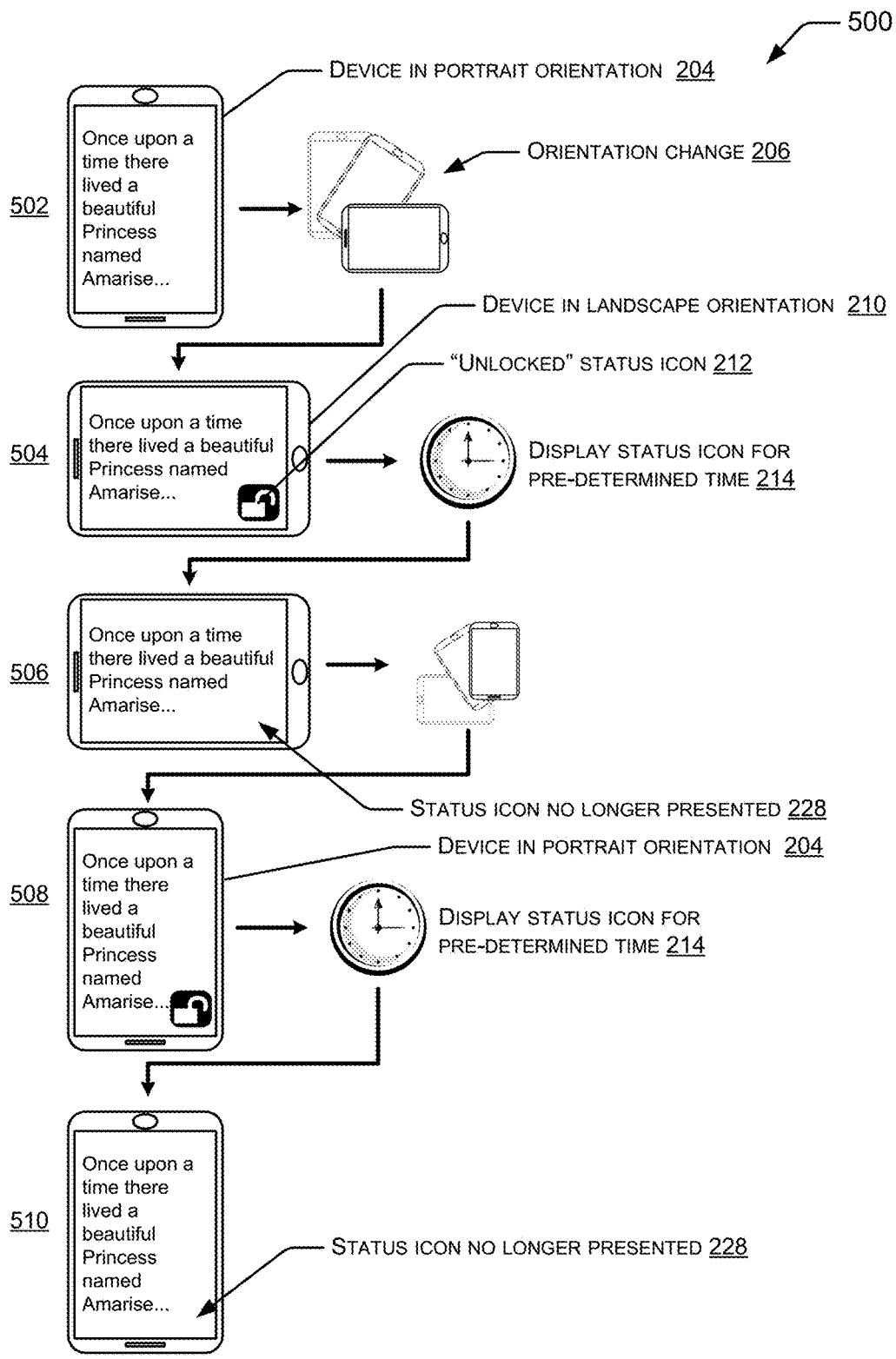
FIG. 5 illustrates an example process and display of an orientation lock status icon after several motions on the device of FIG. 1.

FIG. 5 illustrates an example 500 process and display of displaying an orientation lock status icon after several input motions, when the orientation lock is in an "unlocked" state. At 502, no status icon is displayed on device 102, such as would occur after the status icon has been removed following expiration of the pre-determined time interval 214.

Following an orientation change 206 of device 102, at 504 the orientation of the content on the display has been changed as determined by the reorientation from portrait orientation to landscape orientation. Additionally, the orientation lock module 108 generates the "unlocked" status icon 212 for a pre-determined time 214.

At 506, the pre-determined time 214 has expired and the status icon is no longer presented 228. Following another orientation change 206, at 508 the orientation lock module 108 displays the "unlocked" status icon 212 for another pre-determined time 214.

At 510, following the expiration of the pre-determined time 214, the status icon is no longer presented 228. However, the lock control area 216 remains active, thus a user input 220 would again invoke the orientation lock module 108.

Figure 6:
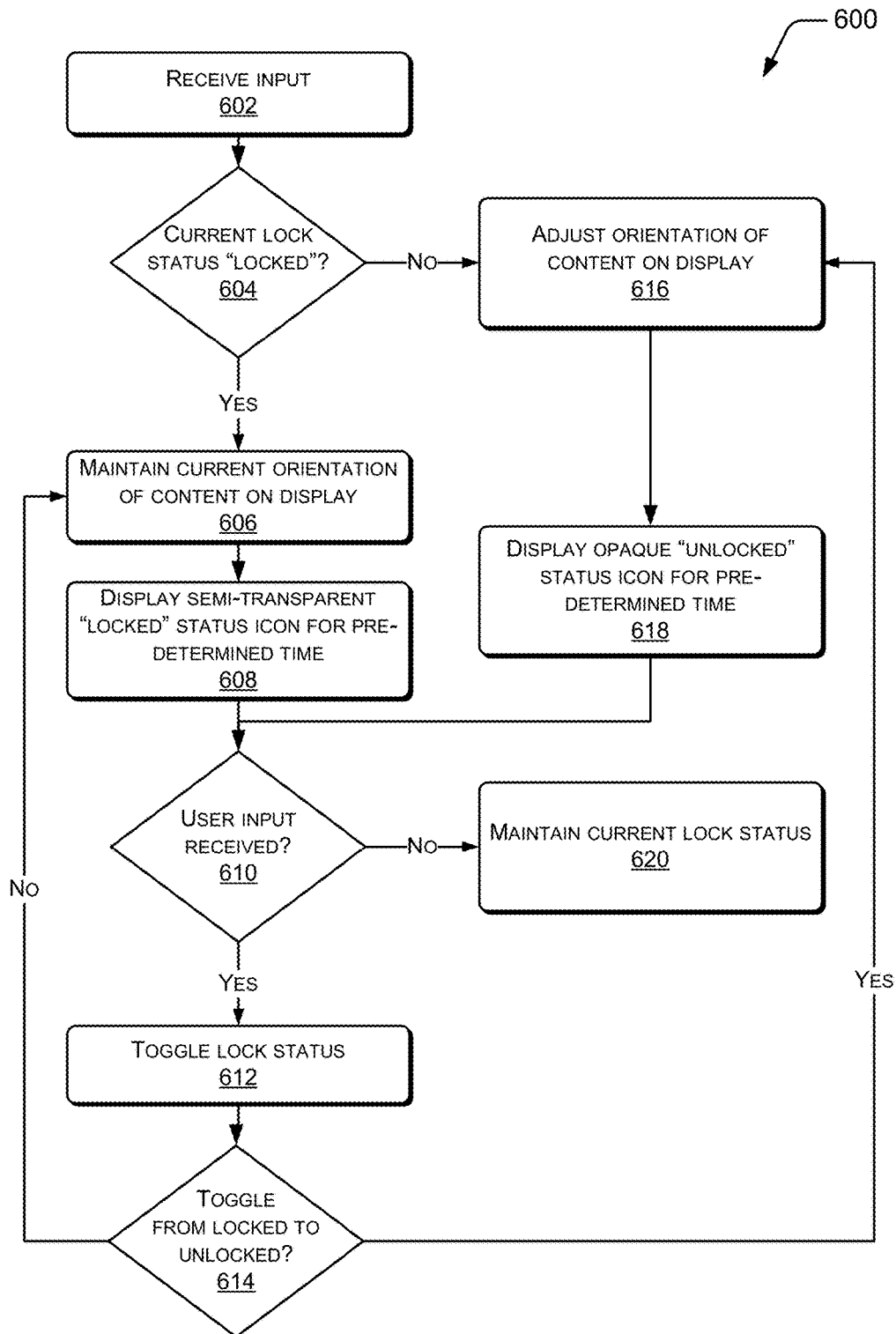
FIG. 6 is a flow diagram of an example process of locking orientation that may be implemented by the device of FIG. 1.

FIG. 6 shows an illustrative process 600 of locking orientation that may, but need not, be implemented using the architecture shown in FIG. 1. The process 600 (as well as process 800 in FIG. 8) is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For example, in some implementations the process described below may be initiated at block 610, with the receipt of user input. For discussion purposes, the process will be described in the context of the architecture of FIG. 1, but may be implemented by other architectures.

Block 602 receives at least one input. This input may be a motion input, indicating a rotation, translation, or other movement of device 102, input from input module 114, and so forth. Block 604 determines whether the orientation lock is "locked" or "unlocked." When the lock status is "unlocked", block 606 maintains a current orientation of content on the display.

Next, block 608 may display a "locked" status icon for a pre-determined time. This "locked" status icon may be semi-transparent to more easily aid in identification and to distinguish the "locked" status icon from other icons.

Block 610 determines when a user input is received. This user input may be a touch on a touch-sensitive display, touch on a touchpad, press of a button, voice command, or other activating signal. When a user input is received, block 612 toggles the orientation lock. "Toggling" comprises transitioning the orientation lock between a "locked" state and an "unlocked" state.

Block 614 determines when the toggle is from a locked to an unlocked state. When the toggle is from a locked to an unlocked state, block 616 modifies orientation of content on the display to correspond to the motion input. Next, block 618 may display an "unlocked" status icon for a pre-determined time. The respective pre-determined times to display the "locked" and "unlocked" status icons may be different. For example, the "locked" status icon may be displayed for about five seconds while the "unlocked" status icon may be displayed for eight. Furthermore, this "unlocked" status icon may be opaque to more easily aid in identification and distinguish from other icons.

Returning to block 604, when the current lock status is determined to be "unlocked," the process may flow to block 616 as described above, and adjusts the orientation of the content on the display to correspond to the orientation of the display.

Returning to block 614, when the toggle is from unlocked to locked, the process may flow to block 606 as described above, and maintain the current orientation of the content on the display.

Figure 7:
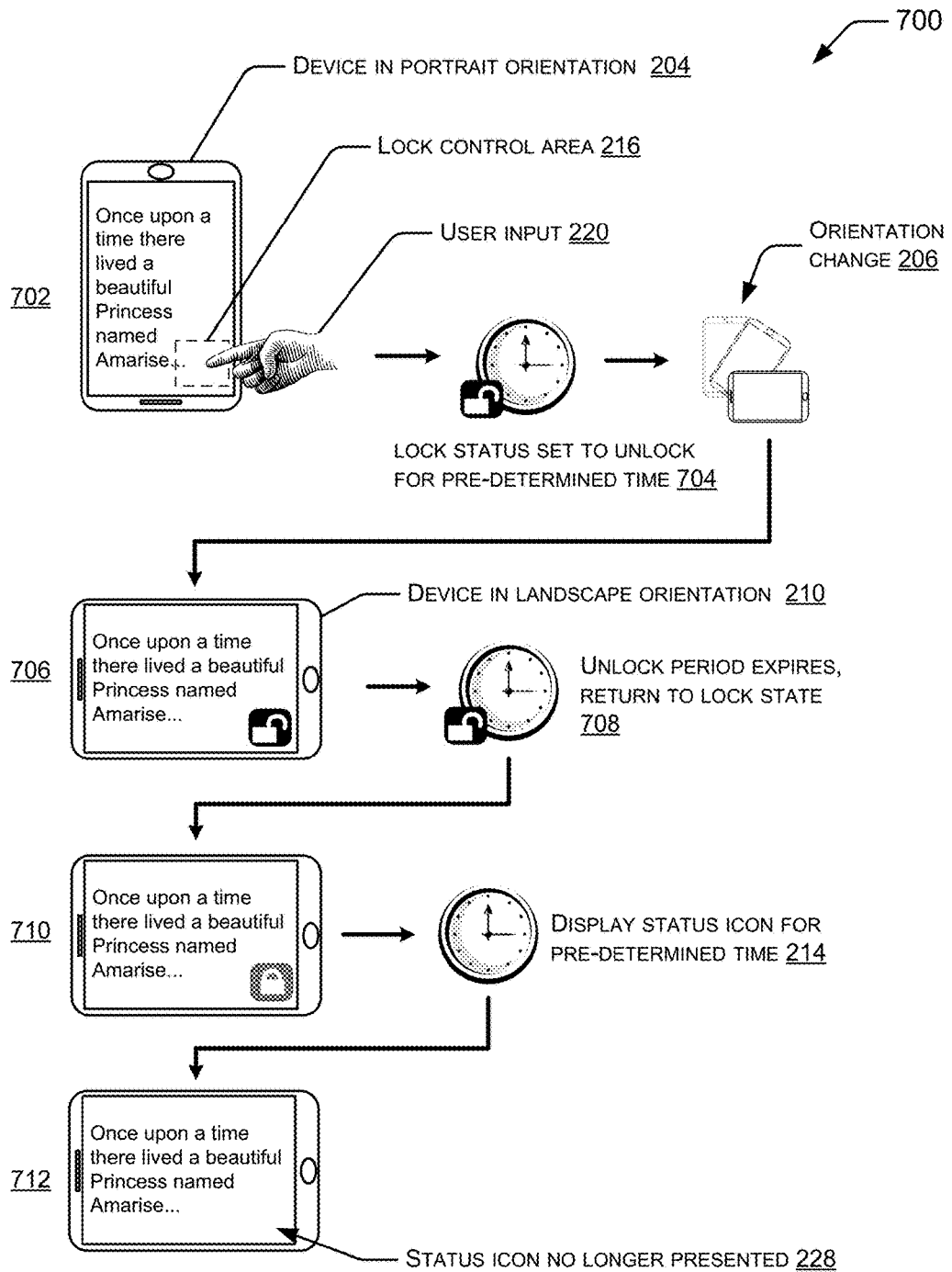
FIG. 7 illustrates an example process and display of an orientation lock on the device of FIG. 1 when unlocked by a user for a pre-determined time, then re-locking.

FIG. 7 illustrates a process and display 700 of an orientation lock unlocked by a user for a pre-determined time. At 702, a user input 220 is received. This user input 220 may be the user selecting the lock control area 216. This selection may be momentary, or may comprise the user selecting the lock control area for a pre-determined time (.e., about two seconds). This selection may unlock a previously set orientation lock for a pre-determined unlock time 704.

While the pre-determined unlock time 704 is unexpired, an orientation change 206 may occur. As a result, at 706 the device 102 is now in a landscape orientation 210, content on the display is now oriented accordingly, and the "unlocked" status icon 212 is visible for a pre-determined time. Upon expiration of the pre-determined unlock time, the lock status is returned to "lock" state 708. Until the orientation lock is released again, the device 102 will display the content in landscape orientation 210, regardless of physical re-orientation of device 102.

At 710, the orientation lock module 108 displays the "locked" status icon 224 for another pre-determined time 214. At 712, the following the expiration of the pre-determined time 214, the "locked" status icon 224 is no longer presented 228. However, the lock control area 216 remains active, thus a user input 220 would again invoke the orientation lock module 108.

Figure 8:
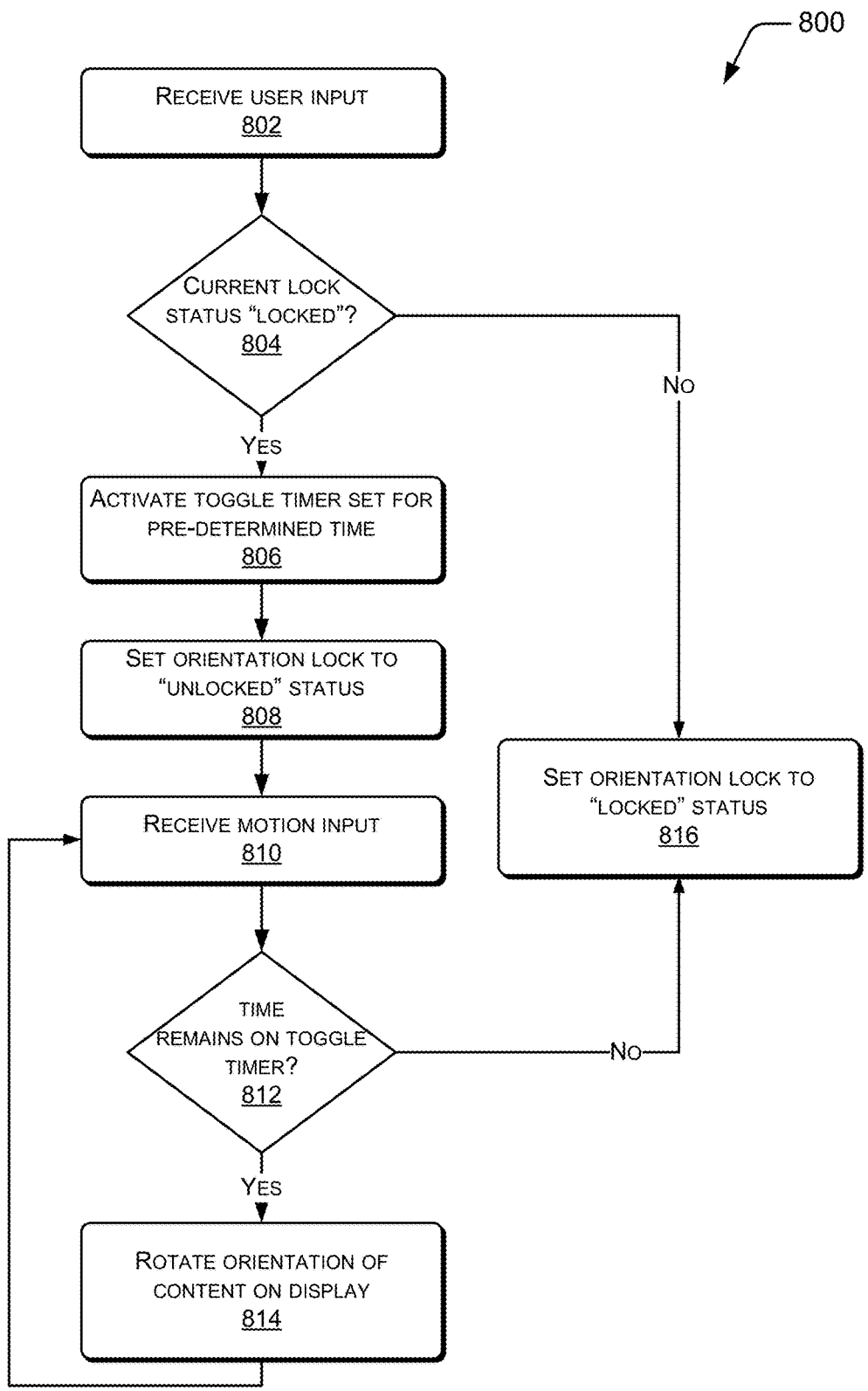
FIG. 8 is a flow diagram of an example process of unlocking an orientation lock on the device of FIG. 1 for a pre-determined time, then re-locking.

FIG. 8 shows an illustrative process 800 of unlocking an orientation lock for a pre-determined time then re-locking which may, but need not, be implemented using the architecture shown in FIG. 1.

Block 802 receives a user input, such as a touch on a touch-sensitive display, touch on a touchpad, press of a button, voice command, or other activating signal. Block 804 determines whether the orientation lock is "locked" or "unlocked." When the orientation lock status is "locked", block 806 activates a toggle timer which may be set for a pre-determined time. This toggle timer measures the duration of an "unlock" period. Next, block 808 sets the orientation lock to an "unlocked" status, allowing the orientation of the content on the display to change in accordance with motion inputs.

Block 810 receives a motion input, as described above, such as a user rotating device 102. Block 812 determines whether time remains on the toggle timer. When time does remain, and the toggle timer has not yet expired, block 814 rotates orientation of content on the display in accordance with the motion input received.

When time no longer remains and the toggle time has expired, block 816 sets the orientation lock to "locked" status. Thus, any further motion inputs will not affect the orientation of content on the display.

CONCLUSION

Although specific details of illustrative methods are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented by a computer, processor or other computing device based on instructions stored on memory, the memory comprising one or more computer-readable storage media (CRSM).

The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computing device.

What is claimed is:

1. A method comprising:
    causing, by one or more processors of an electronic device, presentation of content in a content area of a display associated with the electronic device, wherein the content is presented in a first content format associated with a first device orientation;
    detecting a first rotation of the electronic device from the first device orientation to a second device orientation;
    determining that an orientation lock status is locked or unlocked;
    in response to detecting the first rotation of the electronic device from the first device orientation to the second device orientation and determining that the orientation lock status is locked:
        maintaining display of the content presented in the content area of the display in the first content format;
        causing presentation of an orientation locked status icon in an orientation lock control area of the display to indicate that the orientation lock status is locked; and
    in response to determining a user input is received in the orientation lock control area of the display:
        toggling the orientation locked status icon, the toggling causing presentation of an orientation unlocked status icon in the orientation lock control area to indicate that the orientation lock status is unlocked; and
        displaying the content presented in the content area in a second content format associated with the second device orientation;
    detecting a second rotation of the electronic device from the second device orientation to the first device orientation;
    determining that the orientation lock status is unlocked; and
    in response to detecting the second rotation of the electronic device from the second device orientation to the first device orientation and determining that the orientation lock status is unlocked:
        displaying the content presented in the content area in the first content format associated with the first device orientation; and
        causing presentation of the orientation unlocked status icon in the orientation lock control area to indicate that the orientation lock status is unlocked.

2. The method of claim 1, further comprising positioning the orientation lock control area in an area of the display separate from the content area.

3. The method of claim 1, further comprising positioning the orientation lock control area in a corner of the display relative to the content presented in the content area.

4. The method of claim 1, wherein:
    the orientation locked status icon is semi-transparent; and
    the orientation unlocked status icon is opaque.

5. The method of claim 1, wherein:
    the orientation locked status icon includes a locked padlock icon; and
    the orientation unlocked status icon includes an unlocked padlock icon.

6. The method of claim 5, wherein:
    the display includes a first dimension and a second dimension, wherein the first dimension is greater than the second dimension; and
    in response to determining that the orientation lock status is unlocked, the unlocked padlock icon is oriented such that a top of the unlocked padlock icon is substantially parallel to a first axis associated with the first dimension and a bottom of the unlocked padlock icon is substantially parallel to a second axis associated with the first dimension.

7. The method of claim 6, further comprising ceasing presentation of the unlocked padlock icon after a pre-determined amount of time.

8. The method of claim 7, wherein the pre-determined amount of time is between about one second and about three seconds.

9. The method of claim 7, wherein the pre-determined amount of time is defined by a user.

10. The method of claim 6, further comprising:
    detecting a third rotation of the electronic device from the first device orientation to a third device orientation;
    in response to detecting the third rotation and determining that the orientation lock status is unlocked:
        displaying the content presented in the content area in a third content format associated with the third device orientation; and
        causing presentation of the unlocked padlock icon in the orientation lock control area to indicate that the orientation lock status is unlocked, wherein the unlocked padlock icon is oriented such that the top of the unlocked padlock icon is substantially parallel to the second axis associated with the second dimension and the bottom of the unlocked padlock icon is substantially parallel to the second axis associated with the second dimension.

11. The method of claim 10, further comprising receiving user input to alter the orientation lock status.

12. The method of claim 11, wherein the user input to alter the orientation lock status includes a touch input received via the orientation lock control area of the display.

13. The method of claim 11, wherein the user input to alter the orientation lock status includes a voice command.

14. One or more non-transitory computer-readable media having computer-readable instructions stored thereon that, when executed by an electronic device, cause the electronic device to perform acts comprising:
    causing presentation of content in a content area of a touch-sensitive display of the electronic device, wherein the content is presented in a first content format associated with a first device orientation;
    determining whether an orientation lock status is locked or unlocked;
    in response to detecting a first rotation of the electronic device from the first device orientation to a second device orientation and determining that the orientation lock status is locked:
        maintaining display of the content presented in the content area of the touch-sensitive display in the first content format;
        causing presentation of an orientation locked status icon in an orientation lock control area of the touch-sensitive display, wherein the orientation lock control area of the touch-sensitive display is separate from the content area of the touch-sensitive display, the orientation locked status icon to indicate that the orientation lock status is locked; and in response to determining a user input is received in the orientation lock control area of the display:

toggling the orientation locked status icon, the toggling causing presentation of an orientation unlocked status icon in the orientation lock control area to indicate that the orientation lock status is unlocked; and displaying the content presented in the content area in a second content format associated with the second device orientation;

detecting a second rotation of the electronic device from the second device orientation to the first device orientation;

determining that the orientation lock status is unlocked; and in response to detecting the second rotation of the electronic device from the second device orientation to the first device orientation and determining that the orientation lock status is unlocked:

displaying the content presented in the content area of the touch-sensitive display in the first content format associated with the first device orientation; and causing presentation of an orientation unlocked status icon in the orientation lock control area to indicate that the orientation lock status is unlocked.

15. The one or more non-transitory computer-readable storage media of claim 14, the acts further comprising ceasing presentation of the orientation unlocked status icon after a pre-determined duration.

16. The one or more non-transitory computer-readable storage media of claim 15, the acts further comprising:

detecting a third rotation of the electronic device from the first device orientation to a third device orientation;

determining whether the orientation lock status is locked or unlocked; and in response to detecting the third rotation and determining that the orientation lock status is unlocked:

displaying the content presented in the content area of the touch-sensitive display in a third content format associated with the third device orientation; and causing presentation of the orientation unlocked status icon in the orientation lock control area to indicate that the orientation lock status is unlocked.

17. An electronic device comprising:

a touch-sensitive display;

one or more processors;

a memory, accessible by the one or more processors; and an orientation lock module, stored in the memory and executable by the one or more processors, to program the one or more processors to:

recognize a portion of the touch-sensitive display as an orientation lock control area;

cause presentation of an orientation lock status icon indicating a first orientation lock status;

receive a touch input in the orientation lock control area;

in response to receiving the touch input:

toggle the orientation lock status from the first orientation lock status to a second orientation lock status;

detect an orientation change of the electronic device from a first orientation to a second orientation; and in response to detecting the orientation change of the electronic device:

determine whether to change a format of content presented on the touch sensitive display based at least in part on the second orientation lock status; and cause presentation of the orientation lock status icon indicating the second orientation lock status.

18. The electronic device of claim 17, wherein the first orientation lock status is an orientation locked status and the second orientation lock status is an orientation unlocked status.

19. The electronic device of claim 17, wherein the first orientation lock status is an orientation unlocked status and the second orientation lock status is an orientation locked status.

20. The electronic device of claim 17, wherein the orientation change comprises rotation of the electronic device from a portrait orientation to a landscape orientation.

* * * * *